May 23, 1950   R. E. FULTON, JR., ET AL   2,509,095
ROADABLE AIRPLANE
Filed March 3, 1945   5 Sheets-Sheet 1

Inventors
Robert E. Fulton, Jr. and
Octavio J. Alvarez
By Stevens and Davis
Attorneys May 23, 1950     R. E. FULTON, JR., ET AL     2,509,095
ROADABLE AIRPLANE Filed March 3, 1945                                         5 Sheets-Sheet 4

Inventors
Robert E. Fulton, Jr. and
Octavio J. Alvarez
By Stevens and Davis
Attorneys May 23, 1950 R. E. FULTON, JR., ET AL 2,509,095
ROADABLE AIRPLANE
Filed March 3, 1945 5 Sheets—Sheet 5

Inventors
Robert E. Fulton, Jr. and
Octavio J. Alvarez
By Stevens and Davis
Attorneys

UNITED STATES PATENT OFFICE 2,509,095

ROADABLE AIRPLANE

Robert E. Fulton, Jr., Washington, D. C., and Octavio Jose Alvarez, New York, N. Y., assignors to Continental, Incorporated, Washington, D. C., a corporation of Connecticut Application March 3, 1945, Serial No. 580,845

7 Claims. (Cl. 244—2)

This invention relates to a vehicle primarily intended for use as an airplane in which a section containing the power unit and the operator's controls may be separately used as an automobile.

The history of the airplane is almost as old as that of the automobile. Both appeared at approximately the turn of the century. Yet today, almost a half a century later, there are a very large number of automobiles in this country to every one privately owned airplane.

Such a condition is the result of certain basic shortcomings in the airplane. Airplanes require airports to operate. Airports are of necessity located on the outskirts of communities, not infrequently at considerable distance. Thus the time saved by the speed of aerial transportation is more frequently than not consumed by the ground-travel time required to get from the airport to the flier's final destination.

Furthermore, the expense of travel between the airport and the community, usually involving taxis, is not inconsiderable. When to this is added the initial cost and upkeep of the airplane plus that of an automobile which the flier undoubtedly owns as well, it is obvious why few can afford to own an aircraft.

The average automobile ride from point of origin to destination is not over five miles. For every automobile trip of several hundred miles, the average man makes as many as a hundred short local trips. Since he can afford only an automobile or an airplane, his choice is obvious.

This has been the basic factor in retarding widespread public adoption of the airplane in the past and, unless remedied, will have a serious effect on its future. Various endeavors have been made to circumvent the situation. Closer-to-town airports, locally available cars for rent, and other expedients have been offered but they fail to solve the basic practical and economic problems.

While the real cure has been much discussed, little or nothing of a practical nature has been executed to carry it into effect. Obviously there is much in common between an automobile and an airplane. Both have wheels, a body, a cab or cabin, a motor, and controls for starting, guiding and stopping. When a pilot leaves his aircraft at an airport and takes a cab to town he is leaving behind 90% of the basic elements of an automobile—an expensive and unnecessary procedure which has done more than any other thing to stifle aviation.

Others have recognized this fundamental problem and have made efforts to solve it by accomplishing a transition from airplane to car and back. But the problem has many aspects—mechanical, aerodynamic, practical, safety, economy, comfort, service and maintenance, public reaction and acceptance. Of the several suggested solutions which have been offered to date, all have failed due to neglect of one or more of the above features. Most have been so radical in conception and based on such untried principles that they have failed to hold public interest. Others have made contributions which, unless supplemented by many additional features, were of little practical value.

The present invention therefore is concerned with an airplane having a removable section adapted for use as a standard automobile and an airplane section comprised of wings, fuselage and flight control surfaces, having cooperating interlocking means on the airplane and automobile sections by which the sections may be firmly held together to establish a complete airplane. The present invention contemplates the fact that the conventional automobile has certain functional elements as a steering wheel and clutch and brake pedals, and the conventional airplane has a steering wheel and right and left rudder pedals. Furthermore, the invention considers the practicability of utilizing the same steering wheel and the same foot pedals either for road travel or for air travel, and the invention provides means for simultaneously determining whether they shall serve to control road travel or flight travel.

In its broader aspects the invention is concerned with the possibility of effecting a complete change-over in the functioning of the steering wheel and foot pedals, but the invention also contemplates the fact that in many instances it may not be desirable or necessary to effect such a complete change-over. Thus, with respect to the steering wheel, during road travel it might be connected only to the front wheels and be disconnected from the ailerons and elevators, and during air travel it might be connected only to the ailerons and elevators and be disconnected from the front wheels. While that would be a complete change-over and may in some instance involve the greatest benefits, in other instances it may be more practical or preferable to not effect such a complete change-over. Thus, the steering wheel may be connected to turn the front wheels at all times for both road and air travel.

Likewise, with respect to the foot pedals, a complete change-over in their functioning would mean that during road travel they would be connected to the clutch and brake and be disconnected from the rudder, and during air travel they would be connected to the rudder and be disconnected from the clutch and brake. While this may give the greatest benefits in some instances and give the change-over means of the invention its greatest utility, it is recognized that it may be advantageous in other instances to sacrifice some of these benefits of a complete change-over and have only a partial change in the functioning of the foot pedals.

It should be understood therefore that the invention will be disclosed primarily from the point of view of effecting a complete change-over in the functioning of such manually operable elements as the steering wheel and foot pedals, but that the invention also has in view that only a partial changeover may be effected. Thus, it is considered by numerous authorities, to be a preferred arrangement to have the manually operable elements connected to the airplane flight control surfaces at all times and to have the automobile control mechanisms disconnected from the manually operable elements when the airplane is in flyable condition. This eliminates any possible danger of the airplane control surfaces from becoming disconnected in flight.

As will appear from the following description, the automobile section may include other functional elements which are peculiar to road travel and which preferably should not be operative during air travel. For example, the motor employed may have a power output in order to drive the airplane which is far in excess of that which may be applied safely when the automobile is used for road travel. Therefore, the motor should be equipped with a governor which should be brought into operation during road travel to limit the power output to a maximum safe value. As another example, it may be pointed out that when the airplane is being used, its speed is sufficiently great to cause an adequate draft of air over the engine to cool it. However, during road travel, the speed will seldom be sufficient to cause an adequate flow of air over the engine to maintain it at the requisite low temperature. Consequently, it is necessary to have a supplementary blower or suction fan to force a strong current of air over the engine. This blower or fan need be brought into operation only during road travel when the engine speed is limited by the above-mentioned governor. Otherwise centrifugal force set up in the fan when it is operated at high speed during flight would be excessive.

In changing between road travel and air travel, therefore, a necessary factor is the addition or subtraction of functional elements and this presents a problem of how to accomplish this as a single operation. It is also important to prevent the occurrence of this change during travel either on the road or in the air.

An object of the present invention is to provide in an airplane of this character a master selector member for simultaneously bringing into or out of action the functional elements associated with air travel and, as desired, those functional elements associated with road travel.

It is a further object of the present invention to provide a master selector member of the above designated character and means associated therewith whereby the selector member will be locked in position for road or air travel so long as the engine ignition system is energized.

A further object of the invention is to provide an interlock for such a master selector member which will require the operator to assure that the selector member will be in the position corresponding to the mode of travel which the vehicle is to undergo.

A still further feature of the invention is the provision of means for locking the selector member in the position to which it has been moved, this means being interconnected with an ignition switch associated with that position.

Other features of the invention will be apparent from the following description and from the drawings, in which.

Figure 1:
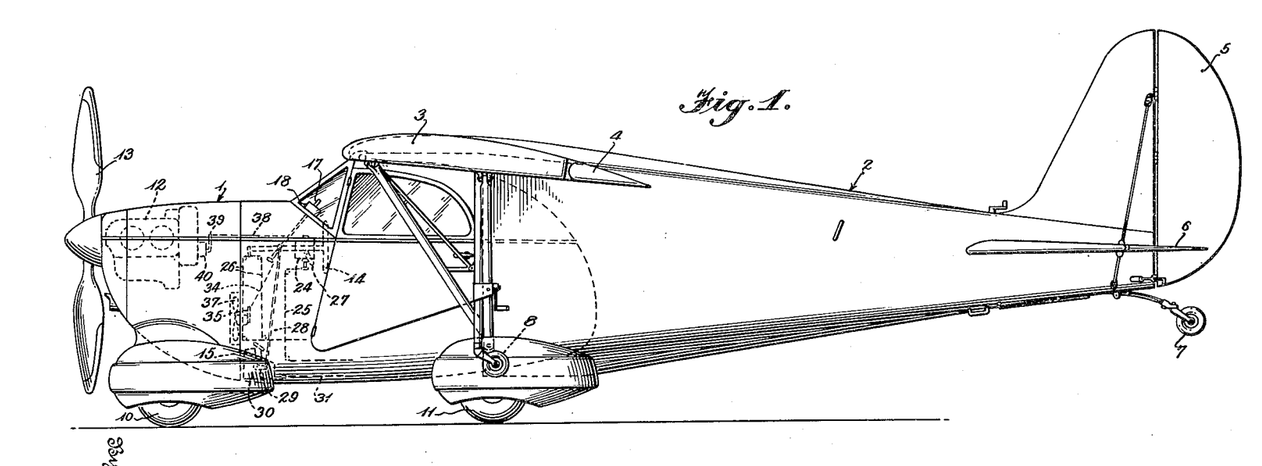
Figure 1 is a side elevation of the airplane as it appears when the automobile and airplane sections are assembled for flight, certain of the functional parts in the automobile section being shown by phantom lines.

Referring first to Figure 1, the automobile section 1 of the airplane appears at the left of the vehicle and the airplane section 2 appears at the right of the vehicle. In Figure 1 these two sections are combined for flight and in Figure 2 they are separated from each other so that the automobile section may be driven independently as a unit for road travel. When the automobile section is used as a unit the airplane section 2 is left behind.

The airplane section 2 includes lifting wings 3 at its forward portion and at the trailing edges of these wings are the usual ailerons 4. At the rear of the airplane section are the usual control surfaces and these include the rudder 5 and the elevators 6. Beneath these tail surfaces is a landing wheel 7.

Figure 2:
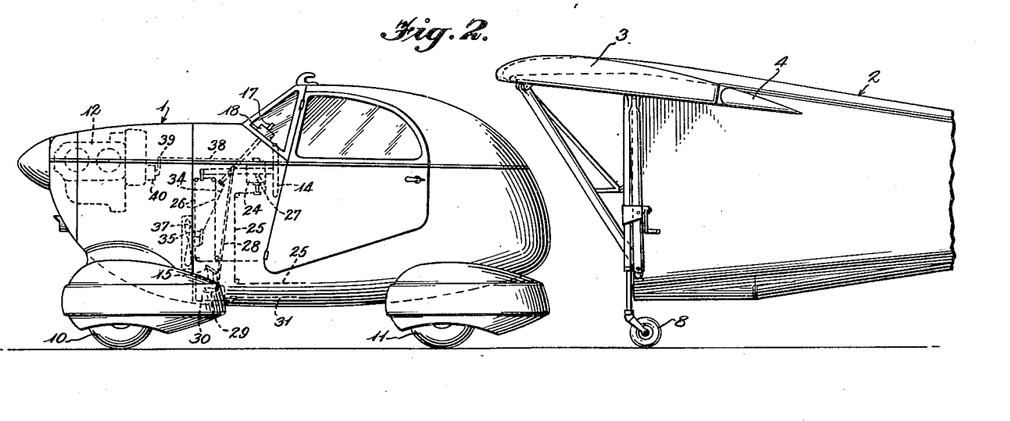
Figure 2 shows the automobile section removed from the airplane section and the airplane section in its self-sustaining position.
Figure 3:
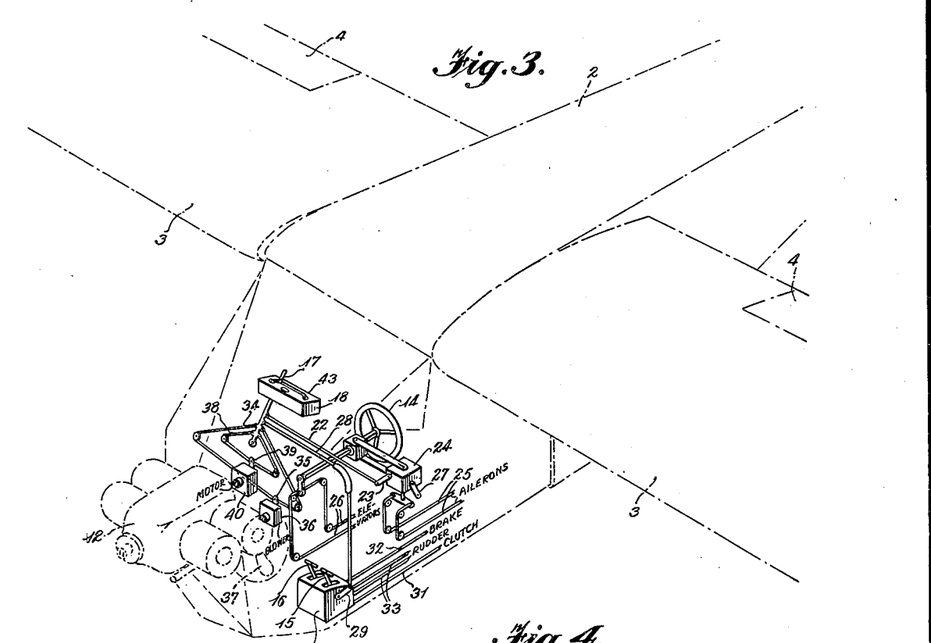
Figure 3 is a perspective view of the forward part of the airplane showing the various control means.

When the airplane section is attached to the automobile section as shown in Figure 1, the airplane section is supported as a cantilever as shown in Figure 1. The means for attaching these sections together and by which the sections may be released from each other constitute no part of the present invention and consequently are not shown in detail. A suitable means is disclosed in application Serial No. 580,844 filed herewith. When this interconnecting means is released and the sections are separated from each other, the airplane section must be self-supporting and to accomplish this it is provided with wheels 8 beneath the forward wings.

Just prior to the time that the airplane section is separated from the automobile section, the wheels 8 and the landing wheel 7 are moved downwardly into contact with the ground. The means by which the wheels 7 and 8 are moved downwardly are not a part of the present invention and therefore are not here described in detail, but a suitable means is disclosed in application Serial No. 580,843 filed herewith. These wheels 7 and 8 support the airplane section in the same position which it would occupy if it were attached to the automobile section so that separation of the sections and their reconnection is facilitated.

The automobile section 1 includes the front wheels 10 and the rear wheels 11. It also includes a motor 12 to which the propeller 13 may be attached for air travel as shown in Figure 1 or from which it may be removed for road travel as shown in Figure 2. A steering wheel 14 within the cab portion of the automobile section is provided so that the front wheels 10 may be turned to guide the automobile upon a road. The foot pedals 15 and 16 are provided to operate the clutch and brakes of the automobile section during road travel. However, during air travel the steering wheel 14 and the foot pedals 15 and 16 are utilized to control the airplane in flight and a change-over must therefore be made in the functioning of these manual control means. In addition, in changing over from air travel to road travel other functional elements and mechanisms within the automobile section must be changed or modified in their action and the means for simultaneously accomplishing this change-over constitutes an important feature of the present invention.

This change-over mechanism includes the single selector member which is available to the operator which is located within the cabin. The selector member is here shown as a pivoted lever 17 which may be moved from one position in which the functional elements are set for air travel to the other position in which the functional elements are set for road travel. To designate these two positions of the selector lever 17, it has associated therewith a locking box 18 which bears the designation "Plane" at 19 and the designation "Car" at 20.

Connected to the lever 17 is a link 22 which is connected at its other end to a lever 23 on the side of a control box 24 associated with the steering wheel 14. In its broadest aspect, that is, from the point of view of effecting a complete change-over, when the lever 17 is in its "Car" position, the lever 23 adjusts the mechanism within the control box 24 so that the lever 27 will be operated and this lever 27 is connected to the front wheels of the automobile so that they will be turned with the rotation of the steering wheel 14. Also at this time the steering wheel 14 is locked against endwise movement.

However, when the selector lever 17 is moved to the "Plane" position, it is contemplated that in this event of a complete change-over the lever 23 changes the mechanism within the control box 24 so that the cables 25 which are connected to the ailerons 4 will be operated upon rotation of the steering wheel 14. Also when the selector lever 17 is in its "Plane" position the steering wheel 14 is released so that it can move endwise and operate the cables 26 which are connected to the elevators 6. The mechanism in the control box 24 which changes over the functioning of the steering wheel 14 from that for road travel to that for air travel constitutes no part of the present invention. A suitable means is disclosed in application Serial No. 580,847, filed herewith, now U. S. Patent No. 2,457,884, issued on January 4, 1949.

Also connected to the selector lever 17 is a cable 28 of the Bowden wire type, the other end of which is connected to a lever 29 on the outside of a control box 30. When the selector lever 17 is in its "Car" position the lever 29 sets the mechanism within the control box 30 so that the pedal 15 is connected to the cable 31 which operates the clutch or similar power disconnecting means of the automobile and the pedal 16 is connected to the cable 32 which operates the brakes within the wheels of the automobile section.

However, when the selector lever 17 is moved to its "Plane" position the lever 29 is thereby changed to set the mechanism within the control box 30 so that the pedals 15 and 16 will be interconnected and be connected to the cables 33 which operate the rudder 5 at the rear of the airplane section. The details of the control box 30 are not illustrated here as they are not a part of the present invention. A suitable means is disclosed in application Serial No. 580,846 filed herewith.

When the pedals 15 and 16 are connected to the rudder cables 33, because the selector lever 17 is in its "Plane" position, the clutch cable 31 and brake cable 32 will be disconnected from the pedals 15 and 16 so that the free operation of the rudder 5 will not be interfered with.

Also connected to the selector lever 17 is a band 34 which is connected to a lever 35 of a control box 36. When the selector lever 17 is in its "Car" position the lever 35 is moved to a position so that the control box 36 causes blower 37 to be driven by the motor 12. This blower 37 causes a strong draft of air to flow over the motor 12 to cool it. When the lever 17 is in its "Plane" position, the lever 35 is moved to a position which causes the control box 36 to disengage the drive to the blower 37. It is not necessary to operate the blower 37 when the airplane is in flight as the rapid travel through the air causes a sufficiently large draft over the motor to adequately cool it.

Selector lever 17 has additionally connected thereto a band 38 to which is connected a lever 39 of a speed regulator 40. When the lever 17 is in its "Plane" position the lever 39 is in such position that the speed regulator is ineffective and the motor 12 may therefore develop its full power. However, this full power output of the motor will usually be far in excess of that which may be utilized by the automobile section when driven alone and consequently when the lever 17 is in "Car" position, the lever 39 is moved to such position that the speed regulator 40 operates to limit the speed of the engine 12 and thereby its power output.

It will therefore be understood that when the selector lever 17 is in its "Car" position the several functional mechanisms and elements in the automobile section will be set to operate in the manner desired for road travel. Thus, the steering wheel 14 will guide the front wheels, and pedals 15 and 16 will operate the clutch and brake respectively. Also the blower 37 and the speed regulator 40 will be placed in operation. In like manner, when the selector lever 17 is in "Plane" position the steering wheel 14 will operate the ailerons 4 and elevators 6 and the pedals 15 and 16 will operate the rudder 5. Also at this time, the blower 37 and speed regulator 40 will be made inoperative.

The selector lever 17 thus directly controls the operation of blower 37 and speed regulator 40.

It also indirectly controls the operation of the manually operated steering wheel and foot pedals by setting the control boxes 24 and 30 to establish the proper connections for road or air travel. The functional elements in the airplane section or the functional elements in the automobile section are therefore simultaneously brought into action by the selector lever 17.

The functional elements and mechanisms which have been described as under the control of the selector lever 17 are not the only ones which may be desirable in a roadable airplane of the present character. For example, for road travel one type of head lamp may be desirable, whereas for air travel another type of lamp serving as landing lights may be desirable. The change-over from the road lights to the landing lights may be accomplished by another connection leading to the selector lever 17.

It may also be mentioned that when the airplane section 2 is disconnected from the automobile section 1 the cables 25, 26 and 33 leading to the ailerons, elevators and rudder, respectively, may be disconnected or separated at some point between the sections so that the separation of the automobile and airplane sections may readily be accomplished. The means by which these cables may be rapidly disconnected or broken constitutes no part of the present invention and hence is not described herein.

Also it should be mentioned that in some instances it may not be necessary to completely change over the functioning of the manually controllable means. For example, when the steering wheel 14 is connected to the ailerons, it has been found that the connection to the front wheels may remain intact because this guiding of the front wheels will not affect the landing or take-off of the airplane. In like manner the foot pedals may be at all times connected to the rudder cables, and during flight the pedals may be disconnected from their control mechanism for road travel.

Figure 4:
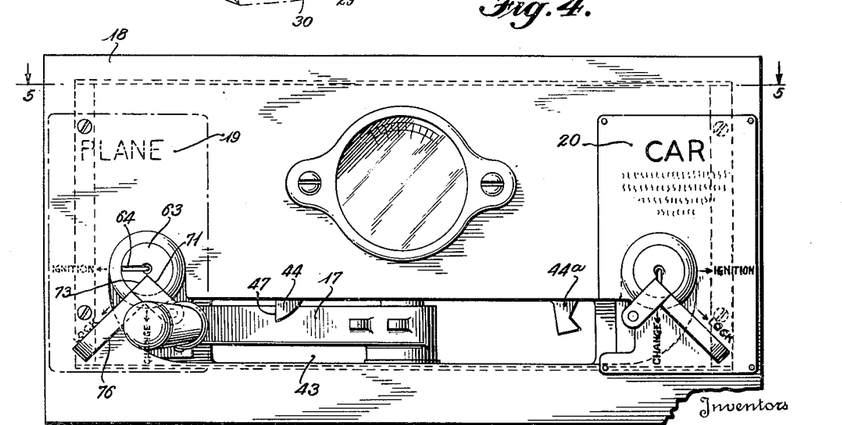
Figure 4 is a face view of the locking box for the selector member.
Figure 5:
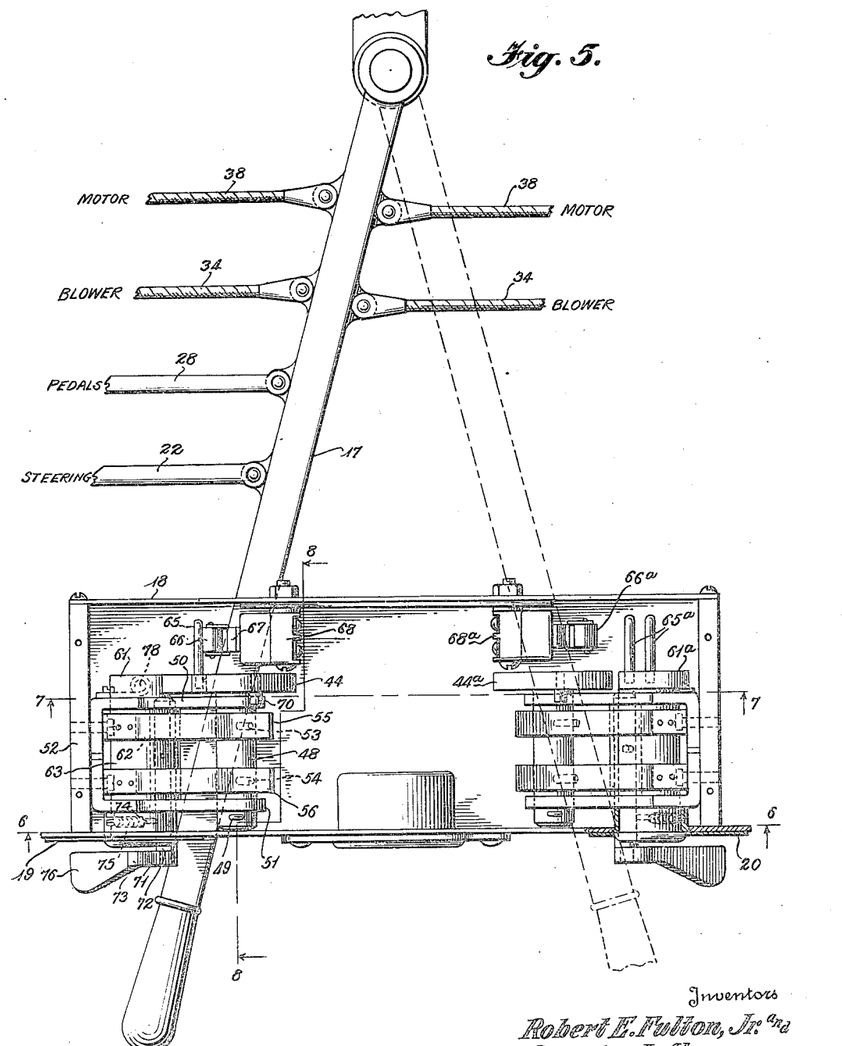
Figure 5 is a plan view of the selector member and the locking box, the side of the latter being removed.

It is important that the lever 17 be locked in the position to which it has been moved corresponding to the mode of travel which is to be undertaken, so that the lever cannot shift from this position and destroy the operation of the functional elements necessary to that particular mode of travel. For example, if the lever 17 is in the "Plane" position shown in Figure 4, it is important that the lever be locked in this position before the ignition can be turned on to operate the motor and that the lever 17 remain locked in this position when the ignition is turned on. In like manner, it is important that the ignition necessarily be turned off before the selector lever 17 can be removed from the "Plane" position. A corresponding condition should be associated with the selector lever 17 when it is in the "Car" position.

This locking means for retaining the selector lever 17 in the position to which it has been moved will be explained with respect to the "Plane" position since the locking means for the "Car" position is a duplicate except for a reversal of the elements. The lever 17 passes through a slot 43 through the locking box 18. Extending into this slot 43 and into the path of movement of the lever 17 is a rotatably mounted disc 44, see Figures 6 and 7. Into the periphery of the disc 44 is formed a notch 45 which thereby forms at its opposite sides shoulders 46 and 47.

Figure 6:
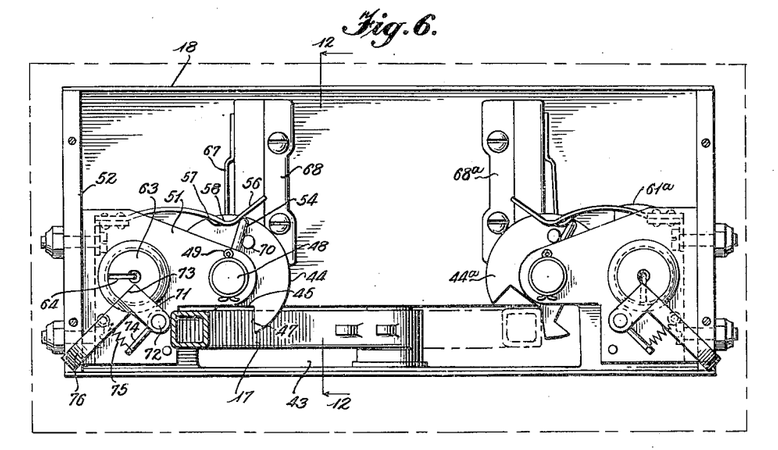
Figure 6 is a section on the line 6—6 of Figure 5.
Figure 7:
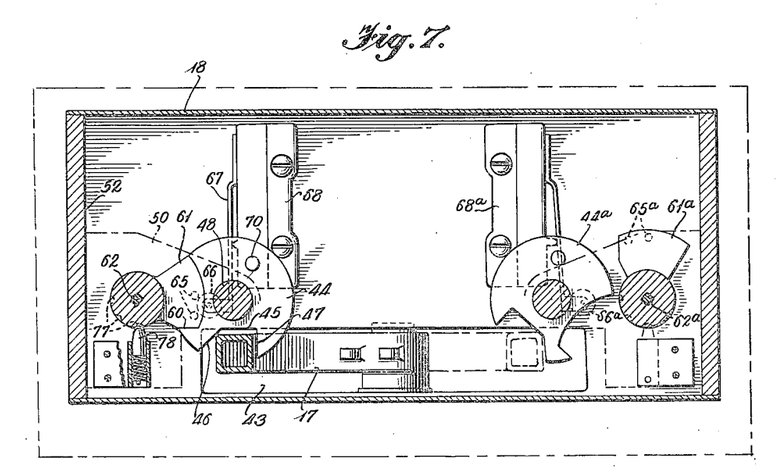
Figure 7 is a section on the line 7—7 of Figure 5.
Figure 11:
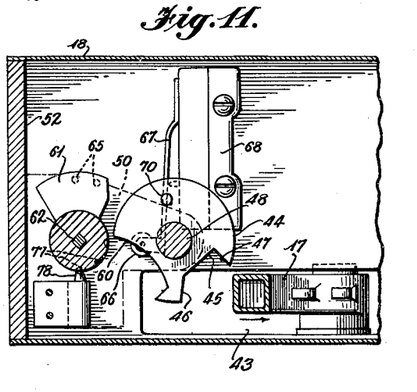
Figure 11 is a section similar to Figure 7, the parts being in the position of Figure 10.
Figure 12:
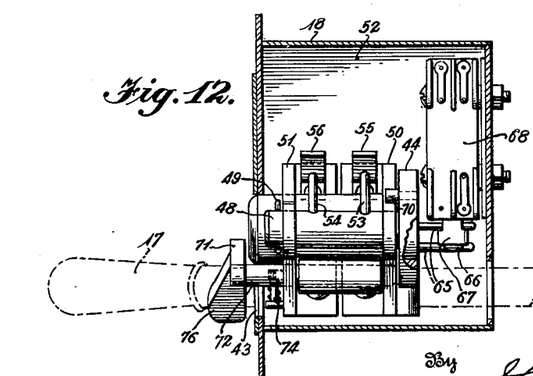
Figure 12 is a section on the line 12—12 of Figure 6.

When the lever 17 is brought toward the disc 44, the disc is in the position shown in Figure 11 so that the lever will strike the shoulder 46 and rotate the disc 44 to the position shown in Figures 6 and 7. The lever will then lie in the notch 45 and its return movement away from the disc 44 cannot be accomplished without contact of the lever 17 against the shoulder 47.

The disc 44 is attached to a shaft 48 rotatably mounted in arms 50 and 51 which are attached to a side wall 52 of the locking box 18. Endwise movement of shaft 48 is prevented by the disc 44 at one end and the cotter pin 49 at the other end. Between the arms 50 and 51 the shaft 48 is provided with radially projecting spaced pins 53 and 54. These pins 53 and 54 are borne upon by leaf springs 55 and 56, respectively, which are attached to the bases of the arms 50 and 51. The springs 55 and 56 are formed with humps 57 and 58 at their portions which are contacted by the pins 53 and 54 and these humps are slightly displaced from each other so that the pins 53 and 54 do not strike the humps 57 and 58 at the same corresponding points.

As a consequence of this displacement of the humps 57 and 58, the pins 53 and 54 cannot become caught in a dead center position which would tend to hold the shaft 48 in an intermediate position. Because of this, when the lever 17 is brought against the shoulder 46 to rotate the disc 44 the springs 55 and 56 will tend to continue the rotation of the disc 44 and carry the lever 17 to its full end position.

After the lever 17 is thus located in the notch 45 of disc 44, it is desirable that the disc 44 be prevented from return movement if the ignition is turned on, to thereby hold the lever in this position. To prevent this return rotational movement of the disc 44 it is formed with another notch 60 (see Figure 9) into which a segment 61 may be moved. Segment 61 is attached to a key shaft 62. When the segment 61 is disposed outside of the notch 61 as is shown in Figure 11, the disc 44 is free to rotate. However, when the disc 44 has been moved to the position of Figures 6 and 7 by the lever 17, the segment 61 may be moved into the notch 60 as shown in Figure 7 by rotation of the key shaft 62, and this will prevent rotation of disc 44.

In this position of Figures 6 and 7 it is impossible for the disc 44 to rotate in a counter-clockwise direction such as it must necessarily do if the lever 17 is to be withdrawn from the "Plane" position. A withdrawal of lever 17 by pressing it against the shoulder 47 is possible only after segment 61 is entirely removed from the notch 60 by turning the key shaft 62. The key shaft 62 is preferably attached to the barrel of a tumbler lock 63 so that the shaft 62 can be rotated only by a key to be inserted in the key slot 64. This tumbler lock 63 is mounted in the arms 50 and 51.

Rotation of the key shaft 62 by the key to the position shown in Figures 6 and 7 should cause the ignition of the motor to become energized. To accomplish this the segment 61 has projecting from the side thereof pins 65 which are slightly spaced from each other and parallel to the axis of the key shaft 62. When the key shaft 62 is in the position of Figure 7, these pins 65 bear against a roller 66 at the end of an operating arm 67 of a microswitch 68. In this position the ignition of the motor will be turned on and as has been explained the lever 17 will be locked in position. Withdrawal of the key when in the position of Figures 6 and 7 should not be possible.

With the arrangement illustrated it is possible to turn off the ignition and still have the lever 17 locked in position. This is accomplished by turning the key shaft 62 by the key to the position shown in Figures 8 and 9. This rotation of the key shaft 62 partially withdraws the segment 61 from the notch 60 as shown in Figure 9, and at the same time withdraws the pins 65 from the roller 66 so that the microswitch 68 is released and the ignition will be turned off.

Figure 9:
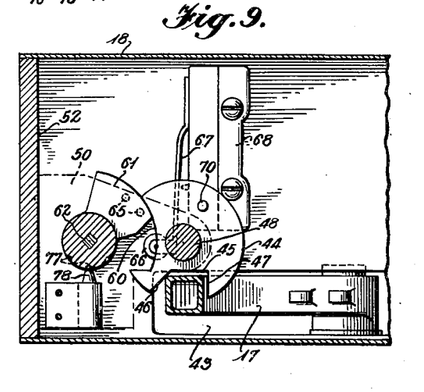
Figure 9 is a section similar to Figure 7, the parts being in the position of Figure 8.

Movement of the segment 61 partially out of the notch 60 as shown in Figure 9 still retains the disc 44 in its lever locking position and this is due to the fact that the periphery of the segment 61 and the opposing wall of the notch 60 are arcs having as their center the center of the key shaft 62. Therefore the disc 44 cannot rotate to permit withdrawal movement of the lever 17 as the periphery of the segment 61 remains against the inner wall of the notch 60. The key should be withdrawable in this position so that the airplane can be left with the lever 17 locked in position.

Figure 10:
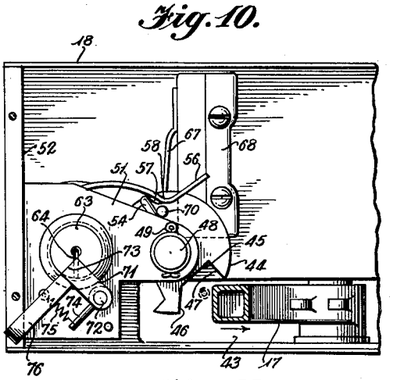
Figure 10 is another section similar to Figure 6, the parts being in a still different position.

When it is desired to change the selector lever 17 from the "Plane" position to the "Car" position the key shaft 62 is rotated to the position shown in Figures 10 and 11. This withdraws the segment 61 completely out of the notch 60 so that the disc 44 is free to rotate. When the lever is now moved toward the right as indicated by the arrows in Figures 10 and 11 the lever 17 contacts the shoulder 47 of the notch 45 and rotates the disc 44. To limit the rotational movement of disc 44 in this direction it is provided with a stop pin 70 which strikes the surface of the arm 50. Rapid withdrawal of the lever 17 will not therefore cause an overtravel of the disc 44 such as might carry the notch 45 to a far position so that the lever cannot enter it when returned to the "Plane" position.

It should be noted that in the positions of Figures 10 and 11, the pins 65 are away from the roller 66 so that the ignition switch 68 is not operated. The key should be withdrawable in this position.

In turning the key to the position of Figures 10 and 11 it is desirable that attention be called to this fact since movement to this position releases the lever 17. This is accomplished by limiting this turning movement of the key shaft 62 by the key by providing a removable stop. This stop includes a plate 71 which is attached to a shaft 72 which is pivoted in the arms 50 and 51. The stop plate 71 presents an end face 73 which is slightly spaced from the key when in the position of Figures 8 and 9. When an effort is made to turn the key from the position of Figure 8 to the position of Figure 10, the key will strike against the face 73 and prevent such rotation. To bias the stop 71 to the position shown in Figure 8, an arm 74 is secured to the shaft 72 and a tension spring 75 is connected to this arm 74.

To move the stop plate 71 out of the path of the key and withdraw the face 73 it is necessary to pivot the plate 71 out of the way and this is accomplished by depressing the thumb piece 76 which projects from the plate 71. With the stop plate 71 thus depressed, the key can be turned from the position of Figure 8 to that of Figure 9. Therefore in order to make a changeover from air travel to road travel attention is called to the fact that this is being done by requiring that the stop 71 be depressed.

Figure 8:
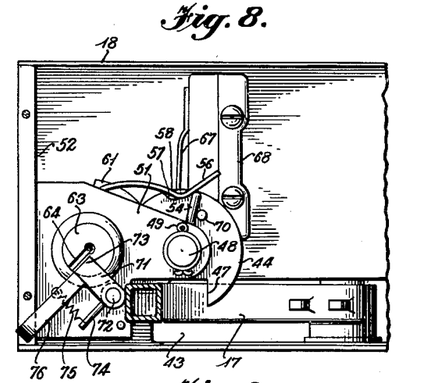
Figure 8 is a section similar to Figure 6, the parts being in a different position.

The key shaft therefore has the three positions shown in Figures 6, 8 and 10. To serve to retain it in any one of these positions the cylinder of the lock may be formed with notches 77 into which a spring pressed detent 78 is urged.

Assuming that the airplane has been temporarily left with the selector lever 17 and key shaft 62 in the position of Figures 8 and 9, the key may be withdrawn from the lock so that it cannot be tampered with. When it is desired to resume flight the ignition can only be turned on at the "Plane" position where the lever is located because if an effort is made to place the key in the lock of the "Car" position, rotational movement of the key shaft 62a (see Figure 7) will cause the segment 61a to strike the periphery of the disc 44a as an abutment, as appears from Figure 7. The ignition switch 68a cannot therefore be turned on as the pins 65a cannot be brought to bear against the roller 66a.

The ignition can therefore only be turned on with the key in the "Plane" position as this is the only key shaft which is free to rotate. This is important because if the switch 68a could be turned on so that the engine could be started, the lever 17 might not be locked in the "Plane" position. The ignition can be turned on only at the position where it will lock the lever 17 in that position.

When the lever is moved to the "Car" position, the same considerations which have been described apply. This interrelation between the two lever positions is therefore a safeguard against misplacement of the selector lever.

What is claimed is:

1. A roadable airplane including an automobile section which may be removed from an airplane section, said airplane section including a plurality of functional elements associated with air travel and said automobile section including a plurality of functional elements associated with road travel, a common selector member movable to one position for simultaneously determining the operation of said air travel functional elements and movable to another position for simultaneously determining the operation of said road travel functional elements, an ignition switch associated with each of said lever positions, and locking means controlled by each ignition switch for retaining said member in the position at which the ignition switch has been energized.

2. A roadable airplane including an automobile section which may be removed from an airplane section, said airplane section including a plurality of functional elements associated with air travel and said automobile section including a plurality of functional elements associated with road travel, a common selector member movable to one position for simultaneously determining the operation of said air travel functional elements and movable to another position for simultaneously determining the operation of said road travel functional elements, an ignition switch associated with each of said member positions, a stop means preventing the energization of the ignition switches except at the position of said member, and locking means controlled by each ignition switch for retaining said member in the position at which the ignition switch has been energized, and making it impossible to move the selector member out of its selected position without first turning off the ignition switch.

3. A roadable airplane including an automobile section which may be removed from an airplane section, said airplane section including a plurality of functional elements associated with air travel and said automobile section including a plurality of functional elements associated with road travel, a common selector member movable to one position for simultaneously determining the operation of said travel functional elements and movable to another position for simultaneously determining the operation of said road travel functional elements, an ignition switch associated with each of said member positions, each ignition switch carrying a stop arm, and a movable element presenting an abutment to each stop arm to prevent energization of the switch, said element being disposed in the path of said selector member to be moved thereby to withdraw said abutment from said stop arm and permit energization of said switch when the member is in one of its positions.

4. A roadable airplane including an automobile section which may be removed from an airplane section, said airplane section including a plurality of functional elements associated with air travel and said automobile section including a plurality of functional elements associated with road travel, a common selector member movable to one position for simultaneously determining the operation of said air travel functional elements and movable to another position for simultaneously determining the operation of said road travel functional elements, an ignition switch associated with each of said member positions, each ignition switch including a stop means to prevent its energization when the member is away from that position, and an element associated with each switch and disposed to be actuated by said member to release the stop means and permit the corresponding ignition switch to be energized.

5. A roadable airplane including an automobile section which may be removed from an airplane section, said airplane section including a plurality of functional elements associated with air travel and said automobile section including a plurality of functional elements associated with road travel, a common selector member movable to one position for simultaneously determining the operation of said air travel functional elements and movable to another position for simultaneously determining the operation of said road travel functional elements, an ignition switch associated with each of said member positions, and a movable member locking element disposed in the path of said selector member at both of its positions, each ignition switch including means to retain said member locking element in locking position.

6. A roadable airplane including an automobile section which may be removed from an airplane section, said airplane section including a plurality of functional elements associated with air travel and said automobile section including a plurality of functional elements associated with road travel, a common selector member movable to one position for simultaneously determining the operation of said air travel functional elements and movable to another position for simultaneously determining the operation of said road travel functional elements, an ignition switch associated with each of said member positions, a movable member locking element having a notch therein to receive said member and be moved by the member to a member retaining position, and means operated by said ignition switch to hold said element in its member retaining position.

7. A roadable airplane including an automobile section which may be removed from an airplane section, said airplane section including a plurality of functional elements associated with air travel and said automobile section including a plurality of functional elements associated with road travel, a common selector member movable to one position for simultaneously determining the operation of said air travel functional elements and movable to another position for simultaneously determining the operation of said road travel functional elements, an ignition switch associated with each of said member positions, a movable member locking element having a notch therein to receive said member and be moved by the member to a member retaining position, and means operated by said ignition switch to hold said element in its member retaining position when the switch is energized, and a manually depressible guard to prevent accidental movement of the ignition switch to its member releasing position.

ROBERT E. FULTON, Jr.
OCTAVIO JOSE ALVAREZ.

REFERENCES CITED

The following references are of record in the file of this patent:

UNITED STATES PATENTS

| Number | Name | Date |
|---|---|---|
| 2,146,800 | De Beeson | Feb. 14, 1939 |
| 2,241,577 | Beals, Jr. | May 13, 1944 |